Nov. 23, 1948.                    L. S. SNELL                    2,454,485
                            CONTROL LEVER MECHANISM
Filed March 1, 1948                                         3 Sheets-Sheet 1

Inventor

Leonard Stanley Snell
by Emery, Holcombe & Blair
                    Attorneys

Nov. 23, 1948. L. S. SNELL 2,454,485
CONTROL LEVER MECHANISM
Filed March 1, 1948 3 Sheets-Sheet 2

Inventor
Leonard Stanley Snell
By Emery, Holcombe & Blair
Attorneys

Nov. 23, 1948.   L. S. SNELL   2,454,485
CONTROL LEVER MECHANISM

Filed March 1, 1948   3 Sheets-Sheet 3

Inventor
Leonard Stanley Snell
By Emery, Holcombe & Blair
Attorneys

Patented Nov. 23, 1948

2,454,485

UNITED STATES PATENT OFFICE 2,454,485

CONTROL LEVER MECHANISM

Leonard Stanley Snell, Bedfont, Feltham, England, assignor to D. Napier & Son Limited, London, England, a company of Great Britain Application March 1, 1948, Serial No. 12,255
In Great Britain March 12, 1947

7 Claims. (Cl. 74—483)

This invention relates to control lever mechanism and while having various applications and uses is intended more especially for use in aircraft and has for its object to enable a control member to be moved first in one direction and then in another by the continued movement of a lever or other part in one direction only.

According to this invention the improved control lever mechanism comprises in combination a rocking lever, a member such as a rod which can be reciprocated to effect the desired control, a pivot connection between this member and a point in the length of the rocking lever distant from one end thereof and arranged so that rocking of the lever will reciprocate the control member, means whereby the lever can be swung laterally as through a guiding gate and transversely with respect to the direction in which the lever can be rocked, and means whereby when the lever is swung laterally the position along the lever of the fulcrum about which the lever can be rocked will be changed from one side to the other of the said point of connection between the lever and the control member, so that the control member may be moved first in one direction and then in the opposite direction by continued rocking of the lever in one direction only. On one side of the rocking lever are two lateral projections spaced apart and lying on the opposite sides of the place at which the lever is connected to the control member, one or the other of these projections, when the lever is swung laterally, engaging one or the other of two similarly placed fixed sockets, each projection when thus engaged with a socket serving as a fulcrum about which the lever can then be rocked.

Conveniently the connection between the lever and the control member is such and the control member is so formed and mounted that when the rocking lever is swung laterally it will move about an axis along which the control member is reciprocated when the lever is rocked and at the same time the control member will be turned about this axis as and when the lever is swung. When the rocking lever is swung laterally the simultaneous turning of the control member about the axis along which it is reciprocated may actuate a switch, cock, valve or the like which controls means for effecting an adjustment of the pitch of the blades of a propeller. The lateral swinging of the rocking lever or its actuation when swung of a switch, cock, valve or the like device may be interlocked with the means for operating other mechanism, so that until this other mechanism has been operated the rocking lever cannot be swung or after it has been swung it cannot effect the actuation of the said devices. For example such interlocking may prevent variation of the pitch of the blades of a propeller to effect braking until the mechanism controlling the undercarriage has been operated so as to fully lower the undercarriage.

Where for instance the lateral swinging movement of the rocking lever takes place through a gate the lever may be permitted to rock beyond the gate opening, that is without swinging it laterally, and means may then be provided whereby it will effect a second control. For instance the first movement up to the position of the gate may shut the throttle of an internal combustion engine and secondly the further rocking movement may shut the fuel cock.

It is the practice in an aircraft that for increasing speed the throttle lever must move forwards and for decreasing speed this lever must be moved backwards. Where, however, a reversible propeller is provided to enable braking to be effected, it is necessary, though decreasing the speed of the aircraft, to increase the engine speed to cause braking by driving the propeller. Thus the throttle must be opened while the lever must still be moved backwards. This can be done by means of the present invention, since when speed is to be reduced the rocking lever is first moved backwards to the gate, thereby moving the control member in the direction necessary to close the throttle, and then by passing the rocking lever through the gate and continuing its movement backwards it will now move the control member in the opposite direction and the throttle will be again opened. At the same time the lateral swinging of the rocking lever through the gate will have brought about the adjustment of the blades of the propeller so that when driven it will act in reverse and exert a braking effect. The rocking lever need not always be moved laterally through the gate, but when it has reached the gate opening, and the movement up to then imparted to the control member has closed the throttle, the lever may be rocked further. The control member is so constructed and arranged that when given this further movement in the direction to close the throttle and after this closing has been effected, the control member will then perform a second operation as for instance the shutting of the fuel cock.

The accompanying drawings illustrate by way of example constructions that may be adopted for carrying the invention into practice. In these drawings—

Figure 1:
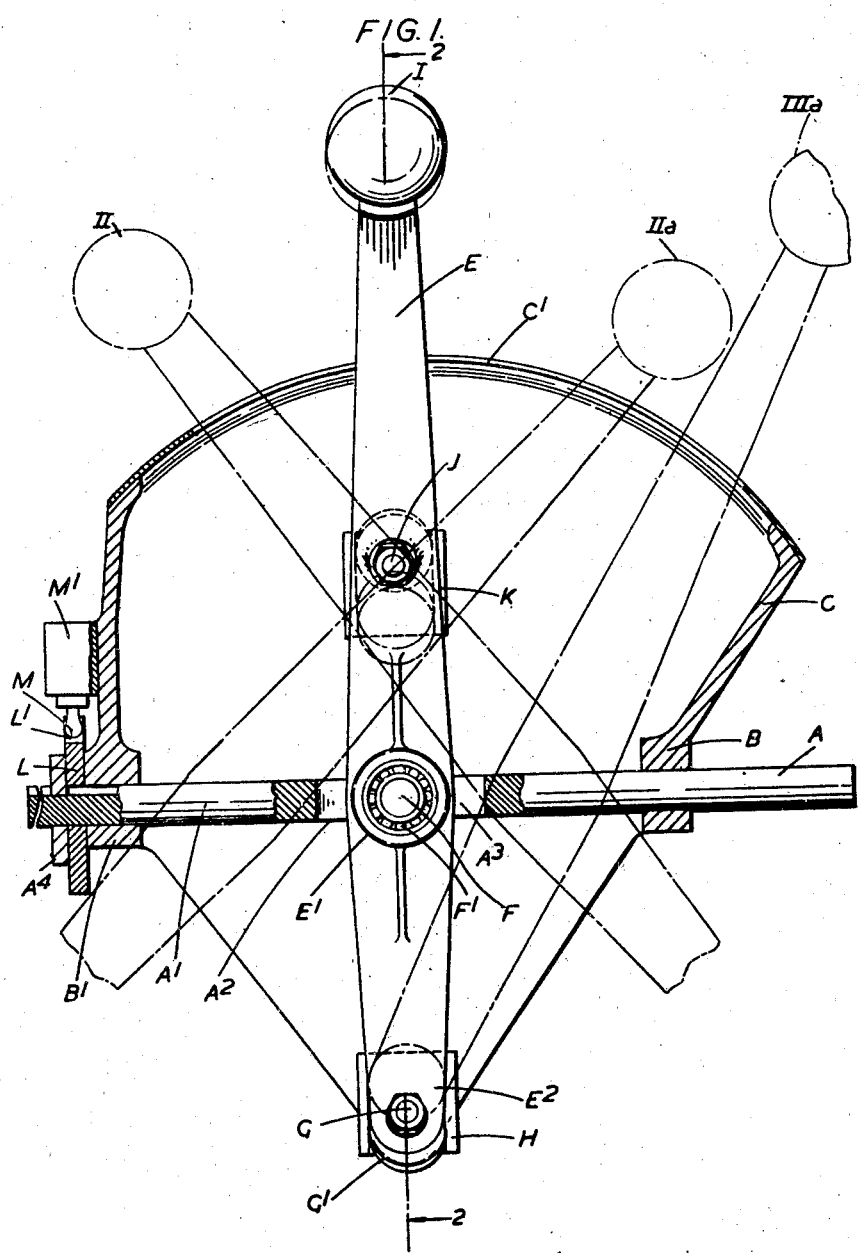
Figure 1 is a part-sectional side elevation of the control lever.
Figure 4:
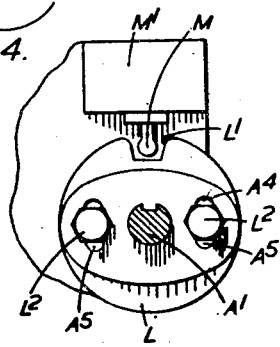
Figure 5:
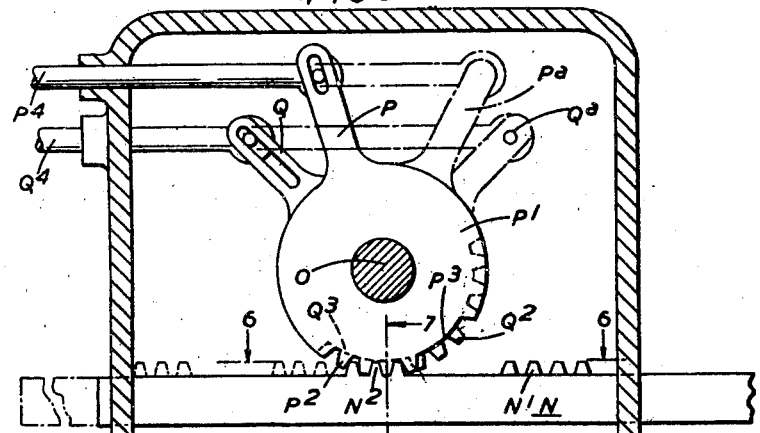
Figure 6:
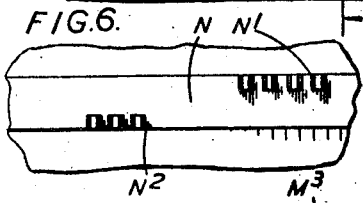
Figure 7:
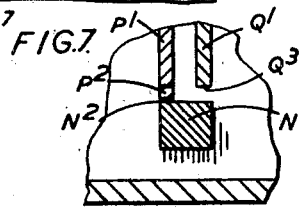
Figure 8:
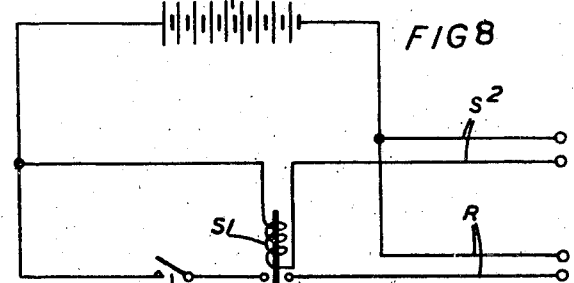
Figure 9:
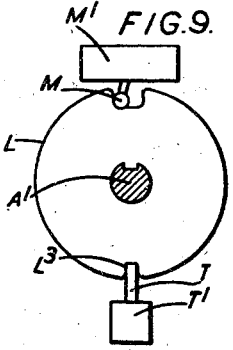
Figure 10:
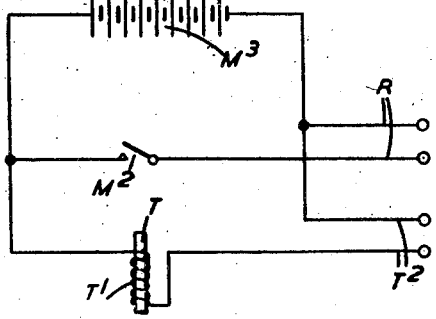

Figure 4 is a partial view of the control lever mechanism as seen from the lefthand side of Figure 1 showing a device for actuating a switch as and when the control lever is swung laterally, Figure 5 is a somewhat diagrammatic side elevation of a construction which may be employed in conjunction with the rod member moved by the control lever and arranged for actuating, for example, the throttle and the cock controlling the fuel supply for an internal combustion engine, Figure 6 is a part sectional plan on the line 6—6 in Figure 5 showing the disposition of the toothed racks on the rod moved by the control lever, Figure 7 is a section on the line 7—7 in Figure 5 through the rod and one of the toothed racks thereon, Figure 8 illustrates diagrammatically how mechanism actuated by the control lever may be interlocked with other mechanism, Figure 9 is a diagrammatic view somewhat similar to Figure 7 but showing an alternative method of interlocking certain mechanism with that more directly actuated by the control lever, Figure 10 illustrates diagrammatically how the interlocking may be arranged with the device shown in Figure 9.

Figure 2:
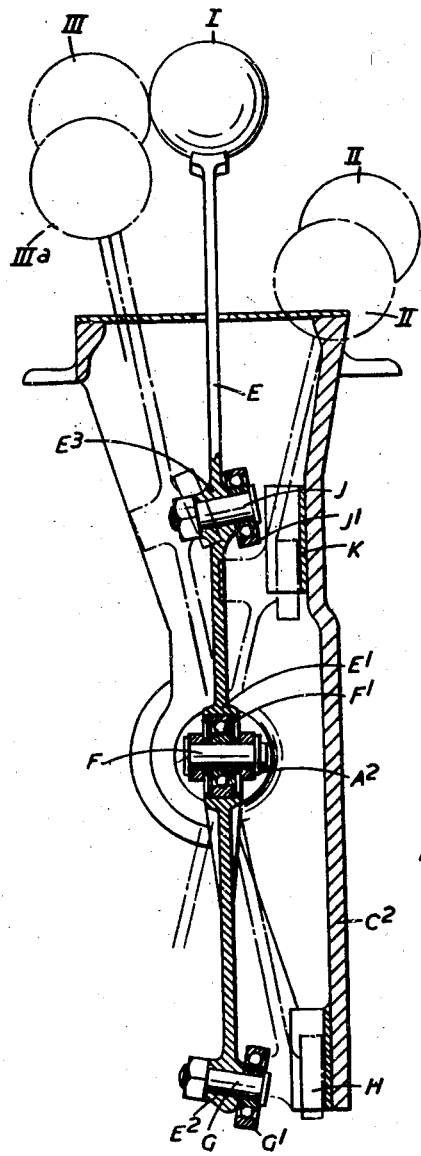
Figure 2 is a section through the control lever on the line 2—2 in Figure 1.

Referring to Figures 1 and 2, the member to which movement is imparted by the improved control lever and through which the controls are effected is conveniently formed as a straight rod with cylindrical end portions $AA^1$ which pass through guides $BB^1$ in which the rod $AA^1$ can reciprocate and also turn about its axis. One or both ends of the rod $AA^1$ may be connected by suitable means to the part or parts to be set or controlled by the movement of the lever and sliding rod. The guides $BB^1$ are arranged on a fixed frame C which conveniently has at its upper part a quadrantal plate $C^1$ wherein are guide slots forming a "gate" in which moves the control lever as it is rocked. This "gate," clearly seen in Figure 3, comprises two oppositely directed slots $DD^1$ in which the lever E can move while it is maintained substantially in one plane and a transverse opening $D^2$ through which the lever can be passed laterally into a third slot $D^3$ in which it can be moved when the lever has been swung into another plane.

The lever E is of such form and length as may be convenient and at its upper end has a suitable hand grip. At a point $E^1$ intermediate in its length the lever E is connected through a pin F and ball bearing $F^1$ to a bifurcated part $A^2$ in the length of the sliding rod $AA^1$, the lever E passing through a slot $A^3$ in this part $A^2$. The arrangement is such that while the lever E can freely rock about the pin F in a plane normal to the axis of this pin and containing the axis of the rod $AA^1$, the lever E can swing laterally in either direction from a mid position about the axis of the rod $AA^1$ which will then be turned about this axis as the lever is swung. When rocked about the pin F the upper part of the lever E can be moved along the slot D into the slot $D^1$ in the plate $C^1$ or moved first along the slot D and then swung laterally through the opening $D^2$ in the gate into the slot $D^3$ along which the lever can be moved further in the same direction, that is to the right as seen in Figures 1 and 3.

At its lower end $E^2$ the lever carries a pin G adapted to act as a fulcrum about which the lever E can be rocked, this pin G passing transversely through the end $E^2$ of the lever and projecting from one side of it, a roller $G^1$ with a ball bearing being mounted on the projecting portion of the pin G. The roller $G^1$ is adapted to engage a socket H carried by a part $C^2$ of the fixed framing when the lever E is swung laterally in one direction about the axis of the rod $AA^1$, that is to the left as seen in Figure 2. The roller $G^1$ fits the socket H and when in that socket provides a bearing for the fulcrum pin G about which the lever E then rocks, and when so rocked it will slide the rod $AA^1$ in the same direction as that in which the whole length of the lever is moved.

A second and similar fulcrum pin J carrying a roller $J^1$ with a ball bearing is mounted at a place $E^3$ in the length of the lever E which is intermediate between the pin F connecting the lever to the rod $AA^1$, and the upper end of the lever. This position of this second fulcrum pin J along the lever E is at a distance from the pin connection F to the rod $AA^1$ which is approximately equal to the distance between that pin F and the fulcrum pin G at the end $E^2$ of the lever. There is a socket K on the framing $C^2$ in a position corresponding to that of the fulcrum pin J, the roller $J^1$ on which can engage this socket when the lever E is swung about the rod $AA^1$ in a direction to the right as seen in Figure 2, opposite to that which is necessary to cause the roller $G^1$ on the fulcrum pin G to engage the socket H. As may be seen in Figure 2 both fulcrum pins G and J project from the same side of the lever E, and the sockets H and K are placed on the frame $C^2$, so that it is only when the lever is passing through the opening $D^2$ in the gate that the fulcrum rollers $G^1J^1$ can be moved into or out of the sockets. It will be apparent that when the lever E has been swung laterally to cause the second and upper fulcrum pin J and its roller $J^1$ to engage the socket K, movement of the lever E will then slide the rod $AA^1$ in a direction opposite to that in which the upper end portion of the lever is rocked.

Figure 3:
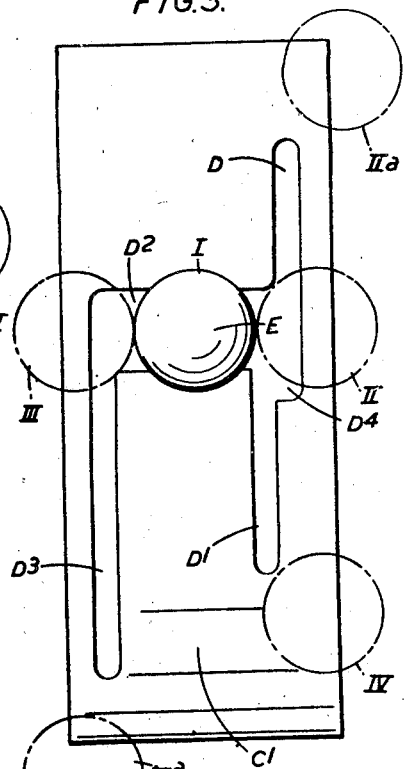
Figure 3 is a plan of the guiding "gate" in which the control lever moves.

Thus when the fulcrum $JJ^1$ is in the socket K with the lever E in the position IIa as indicated in Figures 2 and 3, and if the lever E is then rocked so as to move it in the slots $DD^1$ in the gate, the lever will function as a lever of the first order with respect to the control rod $AA^1$ while it moves about the fulcrum $JJ^1$. When however the lever E has been swung laterally through the part $D^2$ of the gate into the position III indicated in Figures 2 and 3, thereby engaging the fulcrum $GG^1$ with the socket H, then when the lever is rocked in the slot $D^3$ in the gate it will function with respect to the rod $AA^1$ as a lever of the second order. Hence if the lever is initially in the position IIa (Figure 3) so that it can move along in the slot D in the gate and if the lever is then moved into the mid position II as indicated in Figure 3, and is then swung laterally through the part $D^2$ of the gate, it will disengage the fulcrum $JJ^1$ from the socket K and engage the fulcrum $GG^1$ with the socket H. The lever will then be in the position III as indicated in Figure 3 and if it is then rocked further in the same direction, that is to the right as seen in Figure 1, the control rod $AA^1$ which has been first moved to the left in Figure 1 will then be moved with the lever to the right. In this way by continued movement of the lever E in the same direction, in this instance and as seen in Figure 1 clockwise about one fulcrum or the other, a movement will be given to the control rod $AA^1$ first in the opposite direction to that in which the upper part of the lever E is moved and then in the same direction as the whole of this lever is moved.

If this arrangement is employed for example for the throttle control in an aircraft under the circumstances mentioned above, movement of the lever E in the direction necessary to decrease the speed and reduce the fuel supply will first close the throttle, but when the lever has been passed laterally through the gate further movement of the lever handle in the same direction will again open the throttle as will be necessary to drive the propeller when its blades have been adjusted to reverse its action and enable it to function as a brake.

Referring to the positions of the lever E in the gate as seen in Figure 3, it may be said first that when the lever lies in the position I, as indicated in Figure 2 and is in the mid-position in the part $D^2$ of the gate where it is shown in full lines in Figure 3 the throttle is always closed or almost closed whether the lever E is swung laterally so as to engage the fulcrum $GG^1$ with the socket H or to engage the fulcrum $JJ^1$ with the socket K. If now acceleration of the plane is desired the lever E is first swung to the right as seen in Figure 2 from the position I into the position II thereby bringing the fulcrum $JJ^1$ into engagement with the socket K. Next the lever E is rocked to the left as seen in Figures 1 and 3 so that it passes along the slot D in the gate and the lever is then in the position IIa indicated in Figure 1. When the lever E is thus rocked about the fulcrum $JJ^1$ the control rod $AA^1$ will be moved in the opposite direction that is to the right as seen in Figure 1 when the lever was rocked to the left. If it is desired to decelerate the plane the lever E is moved back to the mid-position II opposite the transverse passage $D^2$ in the gate thereby closing the throttle. If when decelerating the plane a reversing propeller is to be brought into operation for the purpose of braking the plane the lever E is swung laterally through the part $D^2$ of the gate into the position III in Figures 2 and 3 thereby bringing the fulcrum $GG^1$ into engagement with socket H. If the lever E is now rocked to the right through the slot $D^3$ into the position IIIa it will turn about the fulcrum $GG^1$ and will move the control rod $AA^1$ in the same direction that is to the right as seen in Figures 1 and 3 and the throttle will again be opened. The lever will now be in the position IIIa indicated in Figure 1. Thus it will be seen that as the lever E is first rocked from the position IIa in Figure 1 while the fulcrum $JJ^1$ is in engagement with the socket K, the lever then passing through the slot D in the gate, and if the lever is then swung laterally when in the position I so that it appears in the position III in Figures 2 and 3 with the fulcrum $GG^1$ in engagement with the socket H, and the lever is then turned into position IIIa in Figures 1 and 3, the control rod $AA^1$ will have been first moved in one direction, namely to the left as seen in Figure 1 and then in the opposite direction, namely to the right as seen in Figure 1, while the lever E has been rocked continuously in the one direction namely to the right.

It is convenient to combine with the control lever mechanism as described above means whereby the blades of the propeller will be adjusted automatically so as to set it for propulsion ahead or for reversing as when the lever E is swung laterally about the axis of the control rod $AA^1$. This may be effected by the arrangement indicated in Figures 1 and 4. There is here shown mounted on the part $A^1$ of the control rod a disc L which in effect functions as a cam, but if desired may be replaced by a lever or other member which as the rod $A^1$ is turned about its axis as the lever E is swung laterally, will actuate a switch, open or close a cock or valve, or bring into operation a relay, the result in each case being to cause or bring about an adjustment of the blades of the propeller in the sense desirable in accordance with the movement of the lever E. Thus for example the cam disc L has in its periphery a notch $L^1$ and the cam itself is adjustable in a circumferential direction about the axis of the rod $A^1$ by connecting the cam disc to the rod through a transverse plate $A^4$ which must rotate with the rod $A^1$ which can slide through the plate $A^4$. The cam disc L carries bolts $L^2$ which pass through oppositely placed slots $A^5$ in the plate $A^4$. This arrangement permits of the cam disc being angularly adjusted on the rod $A^1$. The notch $L^1$ in the cam disc is engaged by a lever M which when moved as the control rod $A^1$ is turned will operate a switch, valve or the like indirectly or through a relay disposed in the casing $M^1$. The movement of this lever M may thus control the mechanism operated for example in a known manner either by electric means or hydraulically or pneumatically which effects the adjustment of the blades of the propeller.

The guide slot D in the gate in the plate $C^1$ may be prolonged somewhat as at $D^4$ to permit certain over movements of the lever E so as to more fully close the throttle as may not be done when the lever is in the position III where it can be swung laterally through the part $D^2$ in the gate. There may also be a further extension $D^1$ of the slot D which, as will be seen in Figure 3, is not quite in line with the slot D so that the lever E cannot be moved into this extension $D^1$ until it has been slightly swung laterally but not sufficiently to disengage the fulcrum $GG^1$ from the socket H. When the lever E is then rocked through the slot $D^1$ into the position IV it will effect a further movement of the control rod $AA^1$ in the same direction which for example may cause the fuel supply cock to be closed after the throttle has been shut.

The following construction illustrated in Figures 5, 6 and 7 enables this operation to be performed. The control rod $AA^1$ is connected to a sliding rod N on which for example on its upper side are two toothed racks $N^1$ and $N^2$. These racks, as seen in Figure 6, are spaced laterally so that they lie in planes on opposite sides of a plane passing through the axis of the rod N. The racks $N^1N^2$ however do not lie side by side but are spaced apart along the rod N as may be seen in Figures 4 and 5. Free to move separately about a common axis O adjacent to the rack rod N are two levers P and Q. The lever P projects from a member $P^1$ provided with teeth $P^2$, while the lever Q extends from a member $Q^1$ having teeth $Q^2$. Adjacent to the teeth $Q^2$ is a gap $P^3$ in the periphery of the member $P^1$ and similarly in the periphery of the member $Q^1$ is a gap $Q^3$ adjacent to the teeth $P^2$. The member $PP^1$ is positioned with respect to the rack member N so that the teeth $P^2$ can engage the teeth $N^2$. The member $QQ^1$ is positioned so that its teeth $Q^2$ can mesh with the teeth $N^1$.

Where for example this device is used in the control of the engine of an aircraft the lever Q acting through a rod $Q^4$ may operate the engine throttle while the lever P acting through a rod $P^4$ may operate the fuel cock, these operations being effected by direct or indirect action. Assuming the throttle to be open and also the fuel cock when the levers P and Q may be in the positions $P^a$ and $Q^a$, indicated in Figure 5, then if the lever E is swung about the fulcrum $GG^1$ so as to move the control rod $AA^1$ and the rack member N to the right as seen in Figure 5, the rack $N^1$ will then be in engagement with the teeth $Q^2$ of the throttle lever Q which will be turned counterclockwise as seen in Figure 5 so as to close the throttle. When the rack member N has been moved the distance necessary to effect this, the rack teeth $N^1$ will no longer mesh with the teeth $Q^2$. Continued movement of the rack member N in the same direction will now cause the rack $N^2$ to engage the teeth $P^2$ and thereby move the lever P controlling the fuel cock. Thus by this means continued movement of the control member $AA^1$ and rack member N in the same direction as may be effected by turning of the lever E through the slot D and the slot $D^1$, will effect first a closing of the throttle and then a closing of the fuel cock.

On the other hand if the control rod A and the rack member N are now moved in the opposite direction, that is when the lever E is moved about the fulcrum $GG^1$ counterclockwise with the rod $AA^1$ and the rack member N moved to the left, the first result will be that owing to the engagement of the teeth $P^2$ with the rack teeth $N^2$ the lever P controlling the fuel cock will be moved in a direction which will open that cock. When this has taken place continued movement in the same direction of the rack member N will bring the teeth $N^1$ into engagement with the teeth $Q^2$ of the throttle lever Q and the throttle will be opened.

This mechanism by means of which continued movement of a control lever in one direction will first actuate, as by rotation, one member such as P up to a limit position and will then pick up and move a second member such as Q, may be employed for various purposes and not necessarily only in conjunction with the particular control lever mechanism for an engine as described above.

While the improved control lever mechanism is as mentioned above intended for use more especially in the control of propulsive apparatus employed in an aircraft, it is to be understood that it may be used for other purposes and in other apparatus where it may be desirable to be able to move a member such as the control rod A first in one direction and then in the opposite direction by continued movement in one direction only of an actuating lever such as E or like part.

Figure 8 and Figures 9 and 10 show alternative arrangements whereby in an aircraft the movement of the control lever when swung laterally may be interlocked so that until certain other mechanism has been operated the lever cannot be swung laterally, or after it has been swung it cannot effect for example the adjustment of the pitch of the blades of a propeller. Referring to Figure 8, this illustrates diagrammatically a switch $M^2$ such as may be enclosed in the casing $M^1$ in Figure 4, this switch being actuated when the cam disc L is turned so as to move the lever M. The switch $M^2$ may close a circuit which includes a source of current $M^3$ and leads R going to the mechanism for varying the pitch of the propeller blades so as to cause the propeller to act as a brake. In this circuit is a switch S actuated by a solenoid $S^1$ which is in a circuit including the source of power $M^3$ and leads $S^2$ going to a switch, not shown, associated with the mechanism for lowering the undercarriage of the aircraft. This latter switch will only be closed when the undercarriage has been lowered preliminary to landing. It is only then that the solenoid $S^1$ will be energised and the switch S closed so that when the switch $M^2$ is closed the propeller blades can be set to function as a brake. Hence if the undercarriage has not been lowered the propeller cannot have the blades set for this purpose.

In the alternative arrangement shown in Figures 9 and 10 there is provided in the cam disc L a notch $L^3$ adapted to be engaged by a detent T which can be withdrawn from engagement with the notch $L^3$ when a solenoid $T^1$ is energised. Unless this solenoid has withdrawn the detent T the cam disc L cannot be rotated, as it will be when the control lever E is swung laterally, so that the switch $M^1$ can be actuated by the lever M. The solenoid $T^1$ as shown in Figure 10 is in a circuit which includes a source of current $M^1$ and leads $T^2$ going to a switch associated with the mechanism for lowering the undercarriage. Only when the undercarriage has been lowered will this switch be closed and the solenoid $T^1$ energised, thus enabling the cam disc L to be turned and close the switch $M^2$ in the circuit with leads R running to the mechanism for setting the blades of the propeller.

What I claim as my invention and desire to secure by Letters Patent is:

1. Control lever mechanism comprising in combination a framing, a rod member mounted in the framing so that it can be reciprocated and also rotated about its axis, a rocking lever, a pivot connection between the rod member and the rocking lever this connection being at a point intermediate in the length of the lever and the connection being such that when the lever is rocked the rod member will be reciprocated and if the lever is swung laterally the rod member will be rotated about its axis, two sockets on the said framing spaced apart in the direction of the length of the said lever, two lateral projections on the said lever placed on opposite sides of the said pivot connection between the lever and the rod member, and both spaced apart from that pivot connection each projection being adapted to engage one of the said sockets on the framing when the lever is swung laterally about the axis of the rod member, each projection when engaged with a socket functioning as a fulcrum for the said lever so that when rocked the lever will turn about that fulcrum and slide the rod member in a direction which will be determined by the fulcrum projection which is engaged with its socket as the lever is then rocked, and a slotted plate mounted on the said framing and constituting a gate through which the said lever passes and by which it is guided as it is rocked and when swung laterally to engage one fulcrum projection or the other with its corresponding socket on the framing.

2. Control lever mechanism comprising in combination a framing, a rod member mounted in the framing so that it can slide in the direction of its length and also rotate about its axis, a rocking lever, a pivot connection between the rod member and the rocking lever this connection being at a point intermediate in the length of the lever and the connection being such that when the lever is rocked the rod member will be reciprocated and if the lever is swung laterally the rod member will be rotated about its axis, two sockets on the said framing spaced apart in the direction of the length of the said lever, a handle at one end of the said lever, a lateral projection at the end of the lever opposite to the handle end, a second lateral projection on the lever at a place intermediate between the handle end and the said pivot connection between the lever and the said rod member, each projection being adapted to engage one of the said sockets on the framing when the lever is swung laterally about the axis of the said rod member, and each projection when engaged with a socket functioning as a fulcrum for the said lever so that when rocked the lever will turn about that fulcrum and slide the said rod member in a direction which will be determined by the fulcrum projection which is engaged with its socket as the lever is then rocked, and a slotted plate mounted on the said framing and constituting a gate through which the said lever passes and by which it is guided as it is rocked and when swung laterally to engage one fulcrum projection or the other with its corresponding socket on the framing.

3. Control lever mechanism including the parts as set out in claim 1 and in which the slots in the said gate plate include two slots which run parallel in the direction of the length of the plate and are spaced apart across it with a transverse slot running between the two parallel slots.

4. Control lever mechanism including the parts as set out in claim 1 and in which the said rod member is connected to mechanism which is actuated when the rod member is reciprocated, and means whereby the actuation of other mechanism is interlocked with the said rod-actuated mechanism so that the actuation of the rod-actuated mechanism is dependent on the actuation of the said other mechanism.

5. Control lever mechanism including the parts as set out in claim 1 and in which the said rod member is connected to mechanism which includes a toothed rack which is adapted to be reciprocated when the said rod member is reciprocated by the rocking of the said rocking lever, and at least one pivoted lever carrying a toothed sector adapted to be engaged by the teeth of the said toothed rack.

6. Control lever mechanism comprising in combination a framing, a rod member mounted in the framing so that it can be reciprocated and also rotated about its axis, a rocking lever, a pivot connection between the rod member and the rocking lever this connection being at a point intermediate in the length of the lever and the connection being such that when the lever is rocked the rod member will be reciprocated and if the lever is swung laterally the rod member will be rotated about its axis, two sockets on the said framing spaced apart in the direction of the length of the said lever, two lateral projections on the said lever placed on opposite sides of the said pivot connection between the lever and the rod member, and both spaced apart from that pivot connection, each projection being adapted to engage one of the said sockets on the framing when the lever is swung laterally about the axis of the rod member, each projection when engaged with a socket functioning as a fulcrum for the said lever so that when the lever has been swung laterally to make operative one of the said fulcrum projections and the lever is then rocked it will slide the said rod member in one direction but if the lever is then swung laterally to render operative the other fulcrum projection and the lever is then rocked further in the same direction as at first the rod member will be caused to slide in a direction opposite to that in which it was moved during the first part of the said rocking motion of the lever.

7. Control lever mechanism including the parts as set out in claim 1 and in which the slots in the said gate plate which guide the movements of the said rocking lever are so formed and arranged that if the lever is at the end of one slot with one of the said fulcrum projections operative and the lever is then rocked through an arc determined by the slot it will slide the said rod member in the opposite direction, and if the lever is then swung laterally through a transverse slot in the gate plate and into a second slot running parallel to the said first slot and the lever is then rocked in the second slot further in the same direction as that in which it was rocked in the said first slot, the lateral swinging of the lever will have rendered operative the other fulcrum projection and the rod member will now be caused to slide in the same direction as that in which the lever moved when rocked through the two said parallel slots in the gate plate.

LEONARD STANLEY SNELL.

No references cited.